R. V. MORSE.
WEAR COMPENSATING GEARING FOR INSTRUMENTS.
APPLICATION FILED OCT. 2, 1918.

1,389,524.

Patented Aug. 30, 1921.

Robert V. Morse
INVENTOR

UNITED STATES PATENT OFFICE.

ROBERT V. MORSE, OF ITHACA, NEW YORK, ASSIGNOR TO MORSE INSTRUMENT COMPANY, INC., OF ITHACA, NEW YORK, A CORPORATION OF NEW YORK.

WEAR-COMPENSATING GEARING FOR INSTRUMENTS.

1,389,524.   Specification of Letters Patent.   Patented Aug. 30, 1921.

Application filed October 2, 1918. Serial No. 256,513.

*To all whom it may concern:*

Be it known that I, ROBERT V. MORSE, a citizen of the United States, residing at Ithaca, in the county of Tompkins and State of New York, have invented a new and useful Improvement in Wear-Compensating Gearing for Instruments, of which the following, taken with the accompanying drawings, is a specification.

This invention relates to gearing employed in instruments and other mechanisms in which a very preceise transmission of motion is desired, and has for its object the elimination of errors due to looseness and backlash in the gearing. As is well known any gearing through use will develop a looseness or backlash due to wear of the tooth faces, and even when this is remedied by adjusting the centers as often as wear develops, there will still remain a slight alteration in the angular relation of the gears due to the change in position of the gear teeth as they are worn away. These effects, while unimportant in ordinary gearing, may introduce serious errors in control instruments and other mechanisms where the precise position or setting of one portion of the mechanism must be transmitted to or indicated at another portion of the apparatus through the operation of an intermediate gear train. It is the object of this invention to permit the extended use of such gearing in apparatus where the precise transmission of angular setting is necessary, by the employment of certain principles by which the effect of wear may be automatically neutralized within the gear train.

Figure 1:
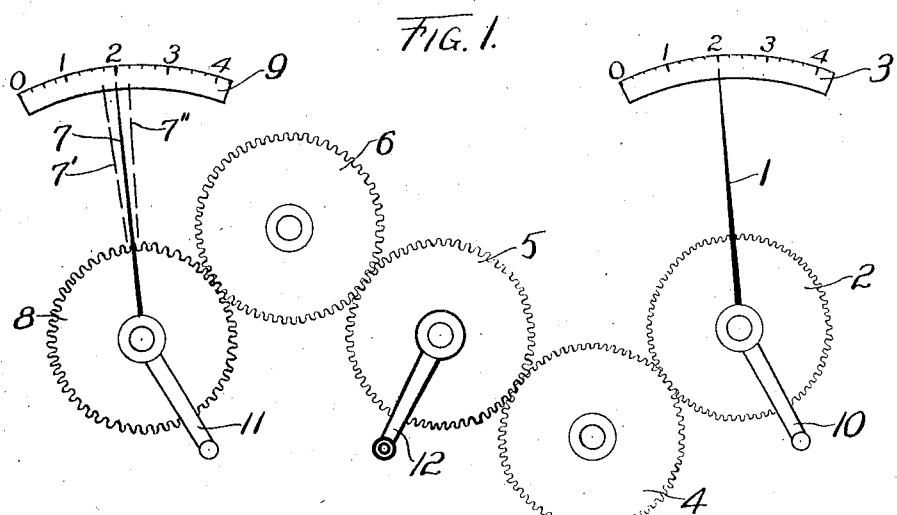
Figure 2:
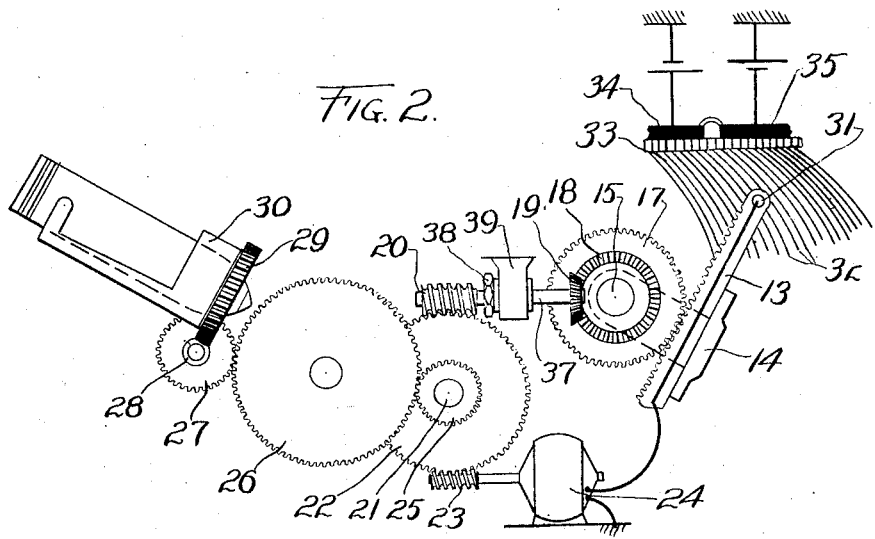

Referring now to the drawings, Figure 1 shows a train of gearing employed in the transmission of precise settings; Fig. 2 shows a more complicated system, employing various forms of gearing, connecting the control block of an electrically operated fuse setter of the automatic type with the fuse setter proper.

Referring now to Fig. 1, the pointer 1 attached to the hub of the gear 2 plays over the scale 3. This motion of the pointer 1 is transmitted through the gears 4, 5, and 6, to the pointer 7 attached to the hub of the gear 8. The pointer 7 plays over a scale 9, identical with the scale 3; and once the pointer 7 is correctly set to correspond to the pointer 1, the readings at the two pointers should thereafter always correspond, assuming that the gearing has no backlash and remains in perfect condition. However, with continued use, backlash will inevitably develop, even if it does not originally exist. This effect of wear is indicated in Fig. 1 by the broken lines 7' and 7" on either side of the pointer 7. If the handle 10 is turned in a clockwise direction to bring the pointer 1 up to the reading 2 on the scale 3, the pointer 7 after backlash has developed, will lag slightly behind and give a slightly erroneous reading as at 7'; while if the handle 10 was turned in a counter-clockwise direction to bring the pointer 1 to the reading 2 on the scale 3, the pointer 7 would lag slightly behind in the other direction and give a reading as at 7". There is thus introduced a total variation of from 7' to 7". The means by which this error is eliminated will now be described.

It will be obvious that the pointer 1 may as readily be operated by the handle 11 attached to the gear 8, by means of the intermediate gear train. If then the operator uses the handle 11 to turn the pointer 1 in a clockwise direction and bring it up to the reading 2 on the scale 3, the pointer 7 after backlash has developed, will give a slightly leading reading, as at 7"; while if the pointer 1, operated by the handle 11, was turned in a counter-clockwise direction when brought up to the reading 2 on the scale 3, the pointer 7 would give a slightly erroneous reading in the other direction as at 7'. It will be noted that the error is changed from positive to negative or vice versa as the handle at which the power is applied is changed. The conditions which give a reading 7' when the handle 10 is used, give a reading of 7",—an error of opposite sign,— when the handle 11 is used. If the power is applied at an appropriate intermediate gear, as by the handle 12 on the gear 5, the pointer 7 will neither lag nor lead the pointer 1, regardless of the direction in which they are turned,—owing to the fact that the errors on one side of the gear train neutralize or balance the errors of the other side. Where the gearing is uniform on each side of some central point as in Fig. 1, the proper point at which to apply the power may be determined by inspection,—namely, at the middle gear. Where one side of a gear train has such characteristics that it will wear more rapidly than the other side, the proper intermediate point of power application will lie toward the side of the most rapid wear, in order that the wear of a short train on that side may balance the wear of a longer train on the other side whose individual elements do not wear so rapidly. But in any case it will be obvious that a point may be selected from which the wear may be almost if not completely balanced. Such a point can, in complicated mechanism, be determined by trial. This balance can be made perfect in a train of any length by introducing at one point a simple wear-compensating adjustment, by which the lag of one side of the train can be made greater or less than that of the other side.

For example, in Fig. 2 a complicated train is illustrated, the balancing point of which could not ordinarily be determined from inspection. The rack bar 13 carried in the guide 14, which is pivoted around the shaft 15, is driven by the pinion 17 which turns on the shaft 15. This pinion 17 is driven by the bevel gearing 18 and 19,—the bevel pinion 19 being driven by the gear 20, which is driven by the gear 22 on the shaft 21. The gear 22 is driven by the worm 23 operated by the electric motor 24; this also drives the gear 25, which meshes with the gear 26, which in turn drives the gear 27. The gear 27 turns the worm 28 which operates the fuse setter gear 29 and sets the fuse setter 30. This setting through the above gear train is determined by the location of the contact point 31 of the bar 13, which is elevated or lowered by the motor 24 receiving positive or negative electricity from the conductors 32 of the control block 33, which are connected to positive and negative brushes 34 and 35. As the rack bar 13 is swung about the shaft 15, the contact point 31 tends to follow a certain conductor 32 through the action of the electric motor 24 which receives appropriate positive or negative current and slides the rack bar 13 in its guide 14, through the operation of the intermediate gearing. Each position of the contact point 31 corresponds to a certain setting of the fuse setter 30. Hence the point 31 corresponds operatively to the pointer 1 of Fig. 1, and the setting ring of the fuse setter 30 corresponds to the pointer 7 in Fig. 1,—these being the two indications which must continuously correspond, and between which wear is liable to introduce an error. The power in this case being applied to the train through the worm gear 23 directly connected to the electric motor 24, and the problem is to so locate this power application that the backlash and rate of wear in both limbs of the train will be equal. To do this by trial, the gear train is set up with the power applied at some intermediate point, and operated continuously for a considerable period, the corresponding setting being carefully noted from time to time. When it appears that one limb of the train is wearing more rapidly, so as to give a reading lagging behind the other, the apparatus is rearranged with the point of power application nearer the lagging end, or the gear elements are altered to balance the wear,—as by employing a lesser number of teeth or a type of gear which wears more rapidly on the leading side, or a type that wears less rapidly on the lagging side. By a few carefully observed trial arrangements, a balanced gear train can be evolved which will neutralize its own error through a considerable period of its life. This balance can also be obtained, and maintained, by employing a wear compensating adjustment of any ordinary type at some point in one of the limbs of the gear train. For example, in Fig. 2, the shaft 37 carrying the gearing 19 and 20 is adjustable by the eccentric bearing 38 carried in the frame 39. When the two limbs of the gear train are in almost perfect balance, by the arrangement of the point of power application in the manner described, the lag or wear of one of the limbs can be slightly increased or decreased by adjusting the eccentric bearing 38, so as to bring the two limbs of the train into perfect balance. This adjustment may have to be made from time to time if the wear is not uniform, but if the balancing of the train has been carefully performed, and an appropriate design thus evolved, the indications or settings at the two ends will continue to closely correspond indefinitely, regardless of wear of the gear elements. The accuracy of the instrument through the greater part of its life will thus not be impaired by wear.

The invention which has been described in connection with two limbs of a gear train branching out from the point of power application can also be applied to any number of limbs or branches of gearing running out from the point of power application, provided that some neutral point is determined from which the wear and lag in the various branches is made equal. The point of power application referred to means of course the neutral point on the train to be balanced, since it is of course immaterial how long a gear train is used to bring the power from the prime mover up to that neutral point. For example, in Fig. 1 the power is shown directly applied to the gear 5 by the handle 12; but the balance would be the same if the power were applied to the gear 5 by a gear train however long extending out from the gear 5, or by any other form of power transmission, so long as the power reached the gear train first at the gear 5. In other words, it is the point of power application on the gear train to be balanced, and not on auxiliary gearing, which is to be considered.

It will be obvious that merely applying power to an intermediate point in a gear train will not necessarily produce a balanced gearing. It is only by arranging and proportioning the gearing according to the principles disclosed above, to give a precise equilibrium in the lag and in the wear of the trains, that a balanced gearing is obtained.

In the foregoing specification certain gear trains have been shown for the purpose of illustration, but it will be obvious to those skilled in the art that the general principles of the invention are applicable to all forms of gearing, and that the apparatus is susceptible to many variations and adaptations in various installations without departing from the scope of the invention as outlined in the following claims:

1. In a wear compensating gearing, the combination of a power applying means, gear trains extending from the power applying means to different points of action, said gear trains being so arranged that the wear between the power applying means and the different points of action is substantially the same, and a wear compensating adjustment in one of the trains whereby two trains may be brought into precise adjustment.

2. In a wear compensating gearing, the combination of a power applying means, gear trains extending from the power applying means to different points of action, said gear trains being so arranged that the wear between the power applying means and the different points of action is substantially balanced, and wear compensating means whereby the trains may be brought into more precise balance.

3. In a compensating gearing, the combination of a power applying means, gear trains extending from the power applying means to different points of action, said gear trains being so arranged that the play in the gear trains between the power applying means and the different points of action is substantially the same, and a compensating adjustment in one of the trains whereby two trains may be brought into precise adjustment by equalizing and balancing the amounts of play.

4. In a compensating gearing, the combination of a power applying means, gear trains extending from the power applying means to different points of action, said gears trains being so arranged that the play in the gear trains between the power applying means and different points of action is substantially balanced, and adjustable compensating means whereby the trains may be brought into more precise balance.

5. In a compensating gearing, the combination of a power applying means, gear trains extending from the power applying means to different points of action, said gear trains being so arranged that the play in the gear trains between the power applying means and different points of action is substantially balanced, and adjustable compensating means of the eccentric adjustment type whereby the trains may be brought into more precise balance.

In witness whereof I have hereunto set my hand this 17th day of September, 1918.

ROBERT V. MORSE.

Witnesses:
MARGARET SUMNER FUERTES,
LOUIS A. FUERTES.